Sept. 3, 1968  J. H. WILSON  3,399,568
SYSTEM FOR INDICATING LIQUID LEVEL
Filed Dec. 14, 1966
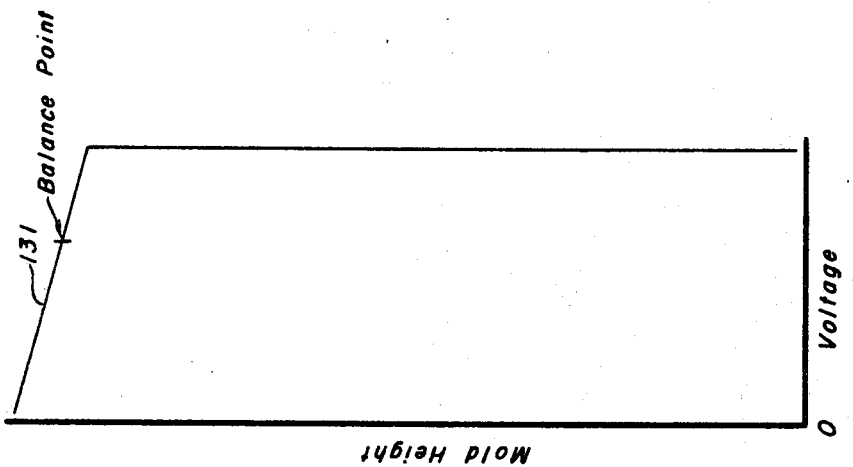
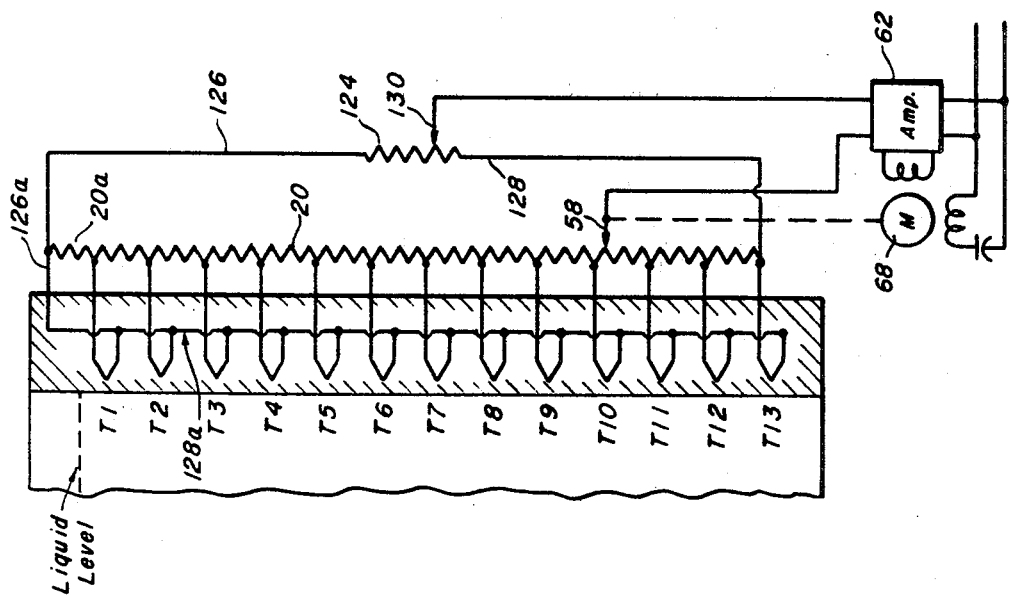
INVENTOR
JAMES H. WILSON
By Donald G. Dalton
Attorney United States Patent Office 3,399,568
Patented Sept. 3, 1968

3,399,568
SYSTEM FOR INDICATING LIQUID LEVEL
James H. Wilson, Franklin Township, Westmoreland County, Pa., assignor to United States Steel Corporation, a corporation of Delaware
Filed Dec. 14, 1966, Ser. No. 601,789
1 Claim. (Cl. 73—295)

ABSTRACT OF THE DISCLOSURE

A supplemental resistor section is added to the upper end of a slidewire resistor in a patented self-balancing bridge system responsive to the change of temperature at the liquid level in a mold for molten metal, as indicated by thermocouples spaced vertically in the mold wall. A shunt from the end of the supplemental section to ground or a point at a voltage lower than that of the topmost thermocouple creates a change in temperature going vertically up the mold wall, even when the liquid level is above the topmost thermocouple.

---

This invention is an improvement on the system of Milnes Patent No. 3,204,460 and provides means affording a voltage difference for giving a visual or control signal when the liquid level is above the uppermost thermocouple of the patentee's system.

The system of the Milnes patent operates in response to a temperature change or difference at the level of the liquid in the mold container. If the liquid level should be above the top thermocouple, this change or difference no longer is indicated and the system drifts.

It is not practical to place a thermocouple at the exact top of the mold or container. My invention, therefore, involves a circuit modification which will maintain a voltage indicating a temperature change, even when the liquid level is above the top thermocouple.

A specific embodiment of the invention is illustrated in the accompanying drawings in which:

FIGURE 1 is a circuit diagram like that of FIGURE 8 of the Milnes patent, showing the modification thereof which I have invented; and FIGURE 2 is a chart showing the voltages of the several thermocouples when the liquid level is above the top thermocouple.

As will be apparent, FIGURE 1, except for the modification to be more particularly described later, is the same as FIGURE 8 of the Milnes patent but for the numbering of thermocouples T1 through T13 and the omission of slidewire 22 and moving contact 60 in engagement therewith. These latter elements may be present but are not necessary. The same reference numerals have been applied to FIGURE 1 as in FIGURE 8 of the prior patent making unnecessary a detailed description thereof or of the operation since both may be gained from that patent. Thermocouples T1 through T13 are positioned in the wall of a mold suited for holding molten metal and are spaced from a point near the top thereof to a point near the bottom or at the lower end of the desired range of indication.

The modified circuit of my invention includes, in addition to what is shown in FIGURE 8 of the Milnes patent, a supplemental resistor section 20a having one end connected to upper end of slidewire 20, and constituting an extension thereof. A shunt 126a extends between the conductor 128a common to all the thermocouples and the other end of section 20a. The shunt may be connected to any point with a voltage lower than that of thermocouple T1 instead of to conductor 128a. This circuit addition causes a voltage difference to be applied to the input circuit of amplifier 62 when the liquid level is above thermocouple T1, causing the system to remain stable, indicating the maximum level in the mold or other container.

FIGURE 2 illustrates at 131 the voltage change from the top thermocouple to the very top of the mold, which is provided by my invention. This imparts stability to the system when the liquid level is above the top thermocouple. That is to say, the voltage falls to zero or some intermediate value from the maximum generated by thermocouple T1 and this change affords the signal to hold the moving contact 58 at the proper balancing point.

It will be evident from the foregoing that the invention herein described has the advantage of overcoming a weakness of the Milnes system by a simple and inexpensive circuit modification. Although I have disclosed herein the preferred embodiment of my invention, I intend to cover as well any change or modification therein which may be made without departing from the spirit and scope of the invention as set forth in the claim.

I claim:
1. In a system for indicating the height of the liquid level in a container wherein the liquid temperature differs from the ambient temperature, including a set of thermocouples thermally coupled, respectively, with a set of points spaced vertically in the container, and a slidewire resistor, said thermocouples being connected, respectively to points spaced along said resistor to correspond to said points in the container, the combination therewith of a supplemental resistor section having one end connected to the point on said slidewire resistor corresponding to the uppermost thermocouple, as a continuation of the slidewire resistor, and a shunt connecting the other end of said section to a point at a voltage below that generated by said uppermost thermocouple, thereby affording a voltage change on the slidewire resistor above the point connected to the uppermost thermocouple.

References Cited
UNITED STATES PATENTS 3,204,460    9/1965    Milnes _____ 73—295

DAVID SCHONBERG, Primary Examiner.
DONALD O. WOODIEL, Assistant Examiner.